United States Patent [19]
Andrusiak et al.

[11] Patent Number: 5,923,285
[45] Date of Patent: Jul. 13, 1999

[54] LOW BANDWIDTH DIGITAL RADAR VIDEO DISTRIBUTION SYSTEM

[75] Inventors: Martin John Andrusiak, St. Paul; Scott Jon Benjamin, Lakeville, both of Minn.

[73] Assignee: Lockheed Martin Corporation, Bethesda, Md.

[21] Appl. No.: 09/050,167

[22] Filed: Mar. 30, 1998

[51] Int. Cl.$^6$ .............................. G01S 13/00; G01S 7/04
[52] U.S. Cl. ........................................ 342/177; 342/185
[58] Field of Search ................................ 342/176, 177, 342/185

[56] References Cited

U.S. PATENT DOCUMENTS

| | | | |
|---|---|---|---|
| 4,630,048 | 12/1986 | Callahan, Jr. ............................ | 342/185 |
| 4,665,402 | 5/1987 | Young ..................................... | 342/176 |
| 5,036,326 | 7/1991 | Andrieu et al. .......................... | 342/176 |

*Primary Examiner*—Ian J. Lobo
*Attorney, Agent, or Firm*—Glenn W. Bowen

[57] ABSTRACT

A system for the distribution of digitized radar video over a digital network is presented. The digital network is located at the low data rate point in the radar scan conversion process resulting in low network bandwidth with no loss of video fidelity. The conversion from analog to digital distribution allows for a totally integrated information network eliminating the need for a dedicated radar distribution network. This approach broadens the use of radar data from traditionally dedicated consoles to all network users. The radar and display system architecture consists of one or more radars and displays. Each radar has a video digitizer and azimuth decoder that is coupled to receive radar analog signals representative of radar data in polar coordinates or other format, which are constructed to provide digital signals representative of said analog signals. Azimuth and range compressors are coupled to receive the decoded digital signals, which are constructed to provide range and azimuth data compression to the decoded digital signals. A window detector is coupled to receive the output of the compressors and is constructed to provide a window-detected output signal to conform to the display screen. The video signals are transferred to the display systems over a digital network, which is inserted between the output of the window detectors and the display systems. Each display system contains a video display configured for Cartesian coordinate display data and a scan converter, which converts digital data from the window detectors of selected radar processors from polar coordinate data format into Cartesian coordinate data format.

30 Claims, 4 Drawing Sheets

LOW BANDWIDTH DIGITAL RADAR VIDEO DISTRIBUTION SYSTEM

BACKGROUND OF THE INVENTION

1. Field of the Invention

The invention relates to radar video distribution and more particularly to a system that allows for the distribution of audio, video and computer data as well as radar data, via a digital distribution network.

2. Background Description

Traditional radar distribution has been implemented with a central analog radar switchboard which accepts inputs from multiple radars and provides outputs to a number of dedicated radar display consoles. The switchboard used a switch matrix to deliver one selected input radar video signal to each console. Such systems were dedicated to this purpose and generally were large and expensive. Recent developments in very high-speed digital networks make feasible the distribution of television video and audio over these digital networks, in addition to computer data. However, prior multiple radar systems coupled to multiple displays continue to use analog distribution networks because of the high bandwidth demand imposed on any digital systems implemented with prior techniques. A prior digital technique of digitizing the analog video data and transmitting it over FDDI rings could be used. However, this technique would fail to significantly reduce the bandwidth and, in addition, would require extensive data processing at each of the displays.

Prior radar systems were broadcast point-to-point without the unique pre-processing steps that are utilized in the system of the present invention. The present invention further reduces the bandwidth required to transmit digital radar video data to the display by pre-processing such data before the network receives it.

The present invention provides for the distribution of radar video to achieve a totally integrated radar distribution system over digital network technologies. The challenge for radar video distribution systems is to achieve maximum fidelity with minimum bandwidth. A typical shipboard radar distribution application is used to illustrate and quantify the problem:

1. Several radars are used (e.g., 5).
2. Each radar has several video outputs (e.g., 2 to 4).
3. Each video has a bandwidth up to 21 Mhz.
4. Several display consoles (e.g., 20) may select any video source, each with a customized view of the data.

According to the Nyquist Theorem, a 21 Mhz signal must be sampled at a minimum of 42 Mhz to ensure reconstruction of the signal. If a digital resolution of 8 data bits per sample is assumed, the raw digitized video bandwidth requirement for a typical system may be calculated as follows:

5 radars * 3 videos (avg) *42 Mhz *8 bits=5.04 Gbps (*indicates multiplication)

This result is the bandwidth required to broadcast all videos at maximum resolution on the network simultaneously so that each console can extract from the network only the radar video it wishes to display. This bandwidth does not depend on the number of display consoles since each console can select one video from the complete set of videos and can perform the necessary processing to provide a unique view of the data. Typical high-speed networks offer bandwidths in the 100 Mbps to 10 Gbps range. The raw digitized video would severely burden even a high performance digital network, limiting the use of this network for other information, such as television and data.

Many data compression techniques exist that could reduce this bandwidth. These techniques fall into two categories, 1) lossless and 2) lossy. The lossy techniques have the disadvantage of reducing the fidelity of the video. With either technique, high-speed custom hardware is required to perform the compression and decompression functions at the rates required to handle real-time high-resolution radar video. Significant improvements have been achieved in recent years with compression algorithms but this has not generally addressed the unique characteristics of radar video.

Frame-based raster video compression algorithms (e.g., MPEG 2) may be used to distribute the scan converted raster image. This lossy approach requires compression and decompression hardware in addition to the scan conversion hardware, introduces additional display latency and fails to take advantage of the unique characteristics of the radar video in polar format. Alternatively, various lossless compression algorithms (e.g., run length encoding, arithmetic encoding, etc.) can be applied to the digitized radar video in polar format. Typically these can be expected to yield compression factors on the order of 10 times. This is not sufficient to reduce the network bandwidth required by radar to a desirable level. The use of lossy compression algorithms to achieve higher compression factors results in undesirable loss of fidelity. The compression problem may be complicated with new radars that randomly change maximum range and azimuth instead of simply rotating with a fixed maximum range.

Scan conversion is the process of converting radar data from a polar coordinate system (range and azimuth) to the Cartesian coordinate system (x,y) required for modern raster displays, typically in plan position indication (PPI) format. The scan converter also allows each console to select a unique view of the radar. The options for this view include range scale, (the range of radar data represented on the display), and offset, (the relative location of the radar origin on the display). Centered PPI is defined as a PPI display in which the radar origin is at the center, while offset PPI is defined as a PPI display in which the radar origin is not at the center of the display and may be off the display. While PPI is the most common radar display format, other scan conversion formats, such as range-height indication (RHI), B-Scan and A/R-Scan (amplitude-range) exist and may be implemented with the present invention.

U.S. Pat. No. 5,036,326 entitled "Method and Device for the Display of Several Radar Images in a Single Mosaic," issued Jul. 30, 1991 in the names of Jean-Pierre Andrieu, et al. shows a method and device for the display of several radar images in a single mosaic image. The present invention provides a network-based system that is also capable of providing mosaic images with enhanced flexibility, reduced cost and optimal display quality.

SUMMARY OF THE INVENTION

A system is provided for the distribution of digitized radar video from multiple radar systems over a digital network to multiple video displays with a substantial reduction in network bandwidth requirements. Analog video data is digitized and compressed into range bins. Azimuth analog data, which is representative of the position(s) of the one or more antennas associated with a particular radar system, is also digitized. The digital azimuth is used to perform window detection which extracts the range bins required for a particular display. The compressed, window detected range bins and azimuth data are transmitted to the displays over a digital network. The displays contain scan converters which convert the data to Cartesian coordinate display data. Radar data from one or more radars may be mixed to provide multiple and composite images.

BRIEF DESCRIPTION OF THE DRAWINGS

The present invention is described by reference to the drawings in which.

DESCRIPTION OF THE PREFERRED EMBODIMENT

Figure 1:
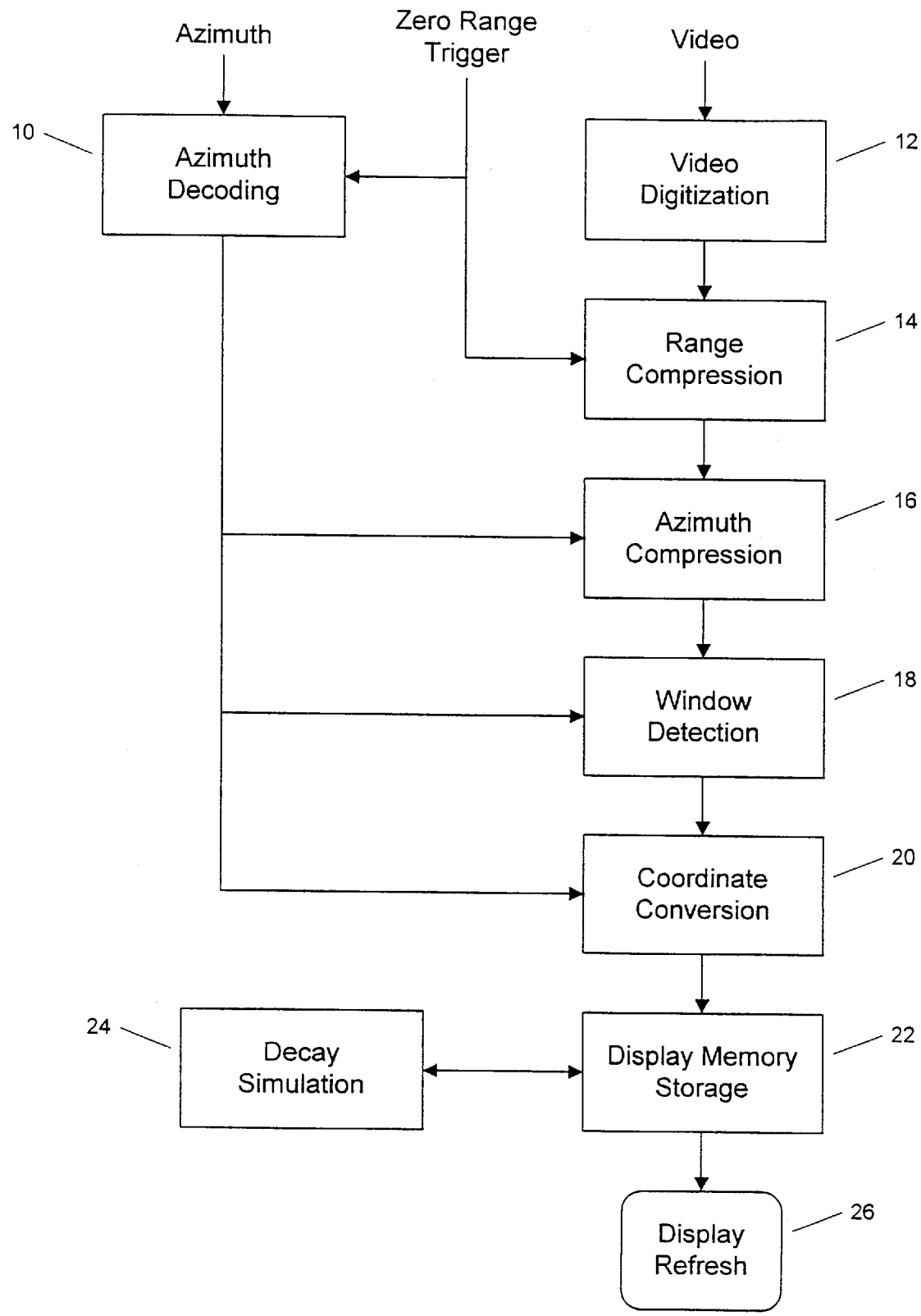
FIG. 1 is a flow diagram of a process that realizes the processing technique of the present invention.

A process flow for realizing the technique of the present invention is depicted in FIG. 1. The radar outputs form the inputs to the process. These include antenna position, range zero trigger and radar video signals. The antenna position signals indicate the direction (azimuth and/or elevation) of the radar pulse. For a typical rotating radar, antenna position is conventionally and hereafter referred to as azimuth. The range zero trigger indicates the time at which the radar pulse is fired. The round trip time from the range zero trigger to the radar video return provides the indication of the range (distance) from the radar to the target. The rate of the range zero trigger signal is defined as the pulse repetition frequency (PRF). The amplitude of the radar video represents a measure of the radar echo return signal after various types of signal processing.

The azimuth decoding sub-process 10 detects the antenna position at the range zero trigger time. The azimuth decoded signals of movable antennas are representative of antenna position and are thus needed for an azimuth compression sub-process 16, if utilized, and for the window detection 18 sub-process and the coordinate conversion sub-process 20, which are described subsequently. The antenna position is converted from the particular radar format to a digital value with typically 10 to 14 bits of resolution. Conventional rotating radar antennas produce sequential azimuth numbers. The rate of rotation is measured in revolutions per minute (RPM). Random scanning radars produce corresponding random (non-sequential) azimuth numbers. The bandwidth required to transfer the azimuth number is insignificant compared to that required for video (about one-thousandth as much is required for azimuth as for video) and is neglected in further analysis herein.

The video digitization sub-process 12 converts the analog video amplitude to a series of digital values. The conversion rate is determined by the bandwidth of the radar video and the Nyquist Theorem, which requires the sampling frequency to be at least two times the bandwidth of the signal being sampled. A typical radar may have a video bandwidth of 20 Mhz, which dictates a minimum sample rate of 40 Mhz. The digital values typically provide 4 to 8 bits of resolution.

The range compression sub-process 14 converts the digital samples to range bins. The range scale of a display is customarily defined as the range represented on the display as measured from the center to the closest edge along an axis. The display resolution determines the number of pixels from the center to edge. The sampling period determines the range represented by each video sample. A range bin corresponds to a pixel along the display axes. The range scale factor is the compression ratio required to achieve the desired range scale. To preserve target information, the range compression sub-process performs peak detection among the compressed samples resulting in a range bin. For example, with a 1024×1024 pixel display, the range scale corresponds to 512 pixels. A sample frequency of about 42 Mhz corresponds to about 512 samples per radar mile (2000 yds.). A range scale of 8 miles would be achieved with a range scale factor of 8:1.

The optional azimuth compression sub-process 16 may be used to reduce the effective pulse repetition frequency (PRF). This is achieved by performing peak detection on corresponding range bins from consecutive radar pulses. A dwell factor is determined by beamwidth overlap on successive radar pulses. Dwell factor is defined as the number of consecutive radar pulses which detect a stationary point target per radar rotation (PRF/(RPM/60)/360*beamwidth) ("/" represents division). The maximum permissible azimuth compression factor without loss of target separation is half of the dwell factor. This is only applicable to rotating radars. For example, a radar with a PRF of 4000 Hz, a rotation rate of 60 RPM and a beamwidth of 0.7 degrees allows a maximum compression factor of 4000/(60/60)/360*0.7/2= 3.9.

The window detection sub-process 18 extracts the peak-detected range bin data which map into pixels that will be visible on the desired Cartesian display region. Those range bins that do not map into the display area for this embodiment will not be visible and may be discarded. Window detection may be range bound, range and azimuth bound or x/y bound. Range bound window detection uses a minimum range and a maximum range to define an anulus containing the display region. When the origin is in the visible display region, the minimum range is zero and the anulus becomes a disc. When the origin is not in the visible display region, minimum and maximum azimuth bounds may be applied to eliminate additional non-visible range bins. Window detection may be further optimized by pre-calculating the minimum and maximum ranges for each azimuth number corresponding exactly to those range bins, which map into the visible display area.

The coordinate conversion sub-process 20 maps the range bins to display pixels. For PPI display format this consists of converting polar range bin coordinates to Cartesian display pixel coordinates. Each radar pulse is drawn on the display as a radial line. The basic equations for converting polar coordinates of range and azimuth (r, Θ)) to Cartesian coordinates (x,y) are: x=r cos Θ, y=r sin Θ. The two main problems in this process are apex removal and hole filling. Radial lines converge near the origin where many polar coordinates map to the same pixel coordinate in Cartesian space, forming an 'apex'. Combining many polar data points into one pixel is referred to as apex removal. Radial lines diverge away from the origin, such that one polar coordinate may map into many Cartesian pixel coordinates. Mapping to a single pixel coordinate leaves holes in the display, which may appear as spokes. Eliminating these holes is referred to as hole filling or spoke filling. These holes may be eliminated by drawing additional radial lines with enough azimuthal resolution to paint all the display pixels. This method, however, results in additional convergences, which require more apex removal.

Display memory storage 22 is used to store a raster display image that corresponds to the visible display pixels.

This memory is updated with pixels from the coordinate conversion sub-process. This update is performed as a read-modify-write operation in which the peak of the new and current value is stored to each pixel location being accessed. Peak detection update resolves the apex removal problem by preserving the maximum target value at any pixel and allows for a history of targets to be maintained. There are known methods of coordinate conversion, which perform hole filling and attempt to reduce or eliminate the apex removal problem. The minimum number of memory cycles is two times the display size. For example, a 1024×1024 pixel display requires 2 M cycles/rotation minimum to update.

The decay simulation sub-process 24 simulates the persistence of phosphor in traditional displays. The decay simulation sub-process decrements each pixel by a predetermined amount at a predetermined frequency corresponding to the decay rate selected. This requires a read-modify-write operation in which the pixel is decremented and restored. For example, a 1024×1024 display with a decay rate of 1 second (from maximum to minimum) requires 2 M cycles/second to perform the decay. The decay has the effect of limiting the length of target trails and removing clutter accumulated by peak-pick updating.

The display refresh sub-process 26 transfers all pixel values to the display surface (CRT). The refresh rate determines the bandwidth required for update and the appearance of the display. The human eye is sensitive to about 20 Hz. A refresh rate slower than 20 Hz will result in visible flicker. For example, a 1024×1024 display with a refresh rate of 20 Hz requires a refresh bandwidth of 20 M cycles/second. CRT displays typically have faster refresh rates, such as 60 Hz or 72 Hz.

The bandwidth requirements at various points in the scan conversion process in a given system may be determined from an analysis of the system. The analysis converts all numbers to megabits/second assuming that the transfers were to occur on a serial network. The following radar display and scan conversion configuration assumptions serve to provide an example, which quantifies the analysis in a typical radar distribution environment:

Radar assumptions: 60 RPM rotation rate, 4000 Hz pulse rate, 20 MHz bandwidth, 42 MHz sampling rate, 8-bit digitization, 0.7 degree beam-width (azimuth resolution), one video output.

Display assumptions: Centered PPI display, 8-bits/pixel, 1024×1024 image, 1024×1280 display, 72 Hz refresh.

Scan conversion configuration assumptions: 512 samples per mile (approximately 42 MHz), 8-bits per sample, 8 mile range scale, azimuth compression factor of 3.9 resulting in 1024 pulses per rotation, 1 second decay rate. The following two display configurations will be considered:

centered PPI and PPI with origin offset to display corner (for worst case line length).

The bandwidth after the video digitization sub-process 12 is 336 Mbps (42 Mhz×8 bits/sample). The bandwidth after the range scaling sub-process 14 is 42 Mbps (336 Mbps/8 range compression factor). The bandwidth after the azimuth compression sub-process 18 is 10.77 Mbps (42 Mbps/3.9 azimuth compression factor). Assuming optimal x/y bound window detection and centered PPI, the average radial is 574.53 samples. Multiplying by 1024 pulses per rotation yields 588,320 samples/scan. Multiplying by 1 scan/sec. and 8 bits gives 4.7 Mbps, which is the average bandwidth after window detection. The worst-case line length is 1024*√2= 1448 pixels when the origin is offset to the corner of the display. The worst-case instantaneous bandwidth is then the ratio of the longest line to the average line times the average bandwidth or 1448 samples/pulse/574.53 avg. samples/pulse×4.7 Mbps=11.9 Mbps.

The bandwidth after the coordinate conversion process 20 is 1024×1024 pixels/scan×1 sec/scan×2 cycles per pixel=2 M cycles/sec. Each cycle requires a 20 bit address plus the 8-bit value, which requires a 32-bit word. The display update bandwidth is at least 32 bits/cycle*2 M cycles/sec=64 Mbps. This number represents the minimum number of cycles for display memory update. More practically, a factor of 3 is required to account for hole filling and apex removal, which yields 192 Mbps. The display memory bandwidth is increased by the decay sub-process. This is an additional 2 M cycles/sec. or 64 Mbps which results in 256 Mbps for the described example. The display refresh sub-process 26 requires a minimum of 20 Hz×1024×1024×8 bits=160 Mbps. If the refresh were synchronized with the CRT then 72 Hz×1280×1024×8 bits=755 Mbps.

Figure 2:
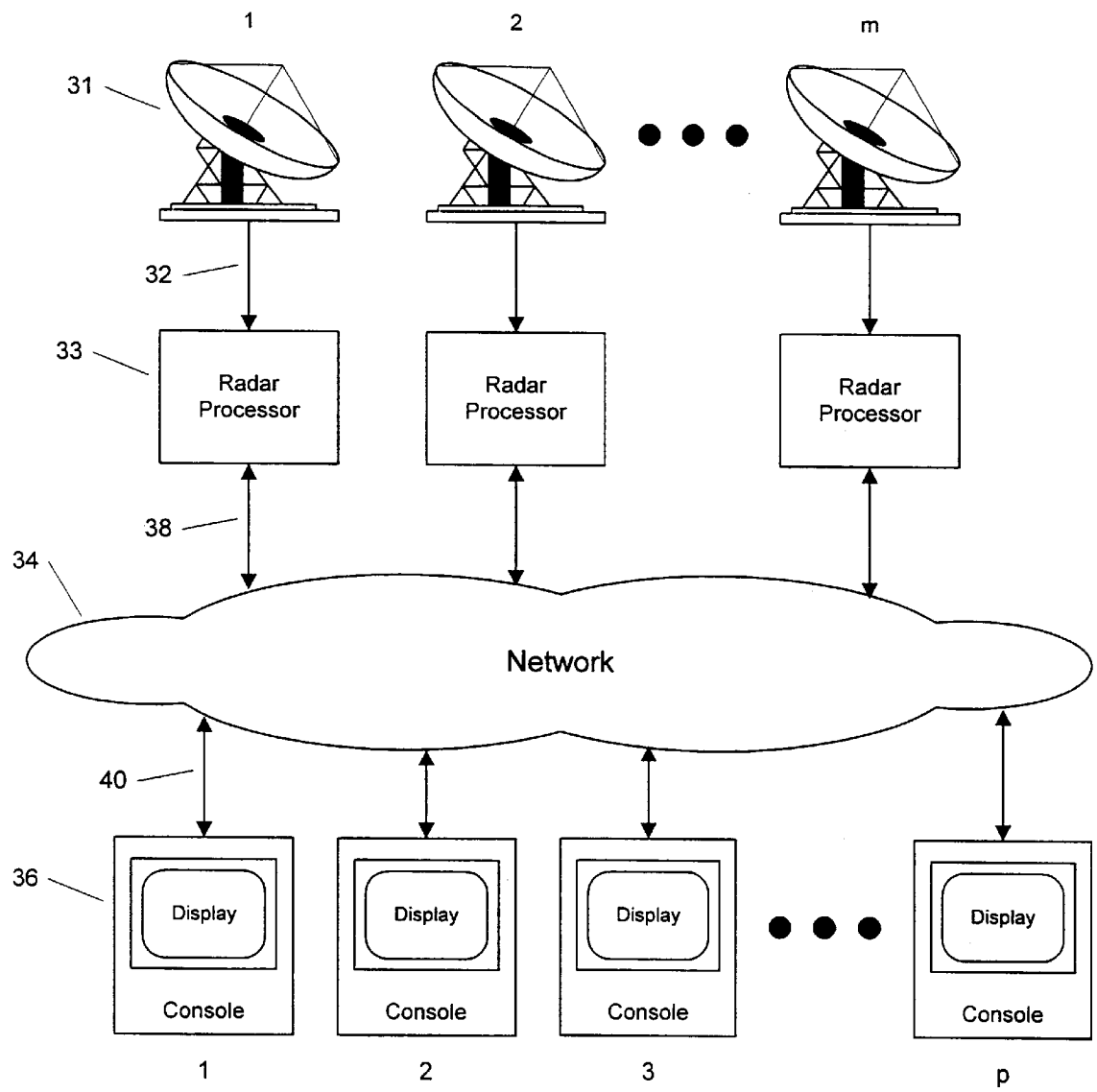
FIG. 2 is an overall block diagram of the system that realizes the system architecture of the present invention.

FIG. 2 shows a multiple radar/multiple display networked distribution system that is implemented in accordance with the invention. One reason for possibly employing a multiple radar system is noted in U.S. Pat. No. 5,036,326 in which several radars are used to eliminate shadows in a zone under surveillance, for example, near airports which are close to mountains or tall buildings. Another application for multiple radars is on a military ship which requires surface surveillance, air surveillance, navigation and weapon system control. The system of this invention may be used for these purposes and for other purposes requiring one or more radars and one or more displays.

Each of the radar systems 31 numbered 1 . . . m in FIG. 2 may present a number, n, of different analog radar video outputs which have been processed to provide different measurements of the radar returns, such as a moving target indicator video or other videos (three video outputs per radar is not uncommon). Each radar system 31 has a radar processor 33 which is coupled to the analog outputs on the lines 32 from the radar system and which produces a digitized output which is coupled to a digital network 34 on the lines 38. A number of display consoles 36, numbered 1 . . . p are coupled to the the digital network 34 on the lines 40. Each display console 36 has the capability of selecting for display a particular one of the radar systems and a particular view (or views) supplied by that radar system. The bidirectional lines 38, 40 may be used to transmit control signals over the network 34 to the radar processors 33 for such selection. A single view from a selected radar system may be displayed on the selected display, or like the system of U.S. Pat. No. 5,036,326, a mosaic pattern may be provided on any of the displays, which is a combination of selected video views provided by the radar systems. The digital network 34 may consist of devices and network topology, which support conveyance of digitized radar information from the multiple radar processors to the multiple display consoles. In addition to radar data, the digital network supports signaling to configure and coordinate operation of the radar processor(s) from the display console (s).

Figure 3:
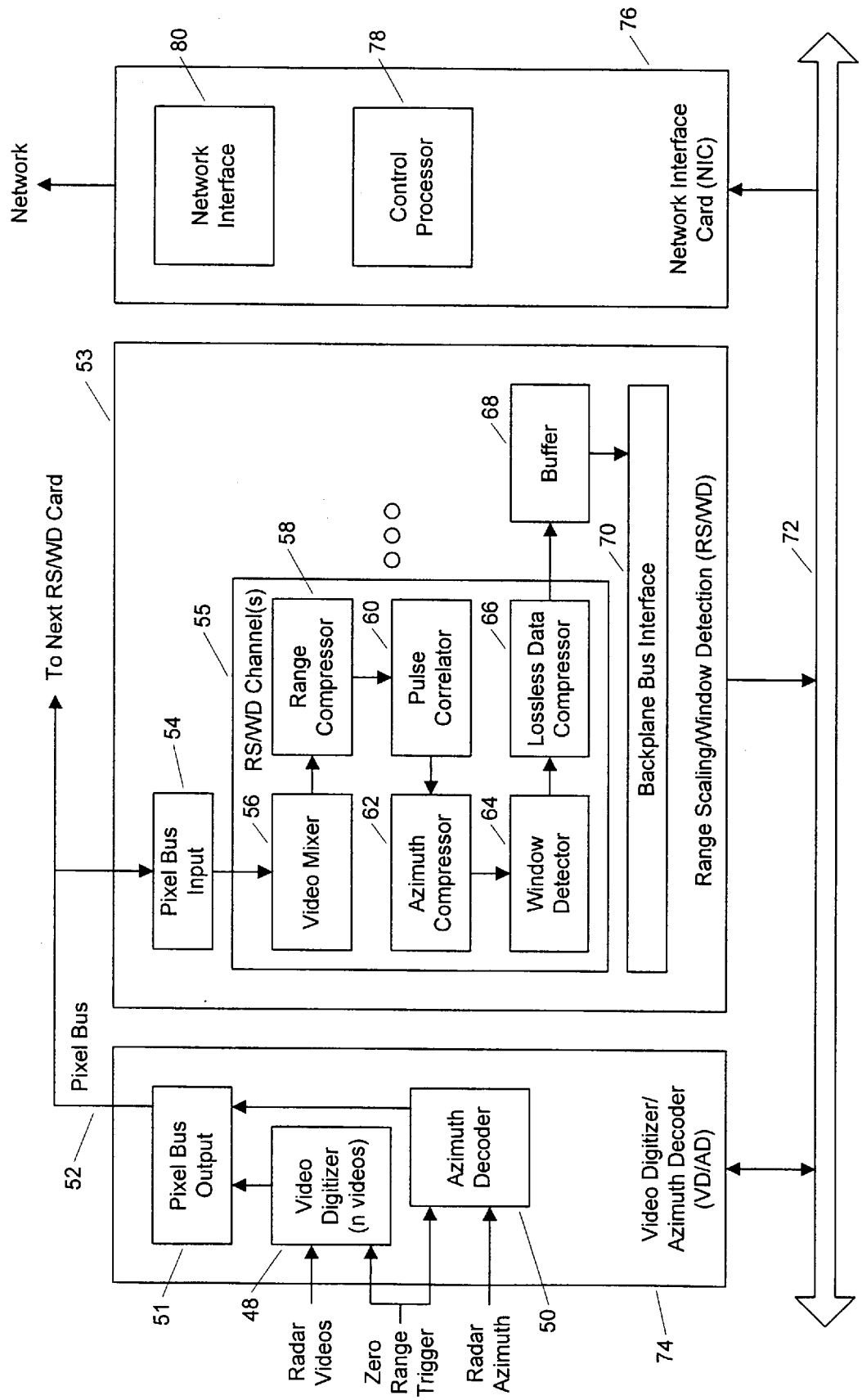
FIG. 3 is a block diagram of the portion of the system architecture of the present invention located at the radar system end of a digital network.

FIG. 3 is a block diagram which shows in greater detail the elements of the radar processors 33 that are utilized at each radar of the system to implement the process described with reference to FIG. 1 through the window detection stage, thereby reducing the required distribution bandwidth of the system. Multiple video inputs and azimuth data are received from the radar system 31 in analog form and are supplied to the video digitizer 48 and azimuth decoder and digitizer 50 of the associated radar processor 33 to digitize the azimuth and n video inputs.

The video digitizer is coupled to supply these digitized signals to an array of range scaling and window detection channels 55. Each channel may perform video mixing (optional), range compression, pulse correlation (optional), azimuth compression (optional), window detection and lossless data compression (optional) to provide a custom view for a particular display. The digitized video signals are first supplied to the video mixer 56, which is followed by compression of the video data by the range compressor section 58. Pulse correlation may then be optionally performed by the pulse correlator section 60. The azimuth compressor 62, when employed, performs azimuth compression of the video data. The window detector section 64 is then used to pre-configure the data so that the polar format output data is pre-matched to the screen of the targeted display. This process is performed prior to the input to the network 34 of FIG. 2 in order to minimize the bandwidth requirements of the network. Lossless data compression may optionally be provided by the lossless data compressor 66 to further compress the data. The processed video and azimuth information is accumulated in a data buffer 68 before transmission to the digital network.

Data from the range scale and window detection channels is conveyed via the backplane bus 72 to the network interface 80. The control processor 78 configures the range scale and window detection channels and prepares the network interface circuitry 80 so that it is able to provide output data, which is representative of the required radar video views over the network 34 to selected displays 16.

The radar processor 33 may be implemented on several circuit cards, as indicated in FIG. 3. For example, the video digitizer 48, the azimuth decoder 50 and the pixel bus output 51 may all be implemented on a video digitizer and azimuth decoder card (VD/AD) 74. The control processor 78 and the network interface 80 may be implemented on a network interface card (NIC) 76. The array of range scaling and window detection channels 55 may be implemented on multiple identical range scaling and window detection cards (RS/WD) 53 with the number of cards determined by the number of unique views simultaneously required from each radar source divided by the number of channels which are implemented on each card. Output lines run from the pixel bus output 51 to the pixel bus input 54 of succeeding RS/WD cards 53 on the pixel bus 52 of FIG. 3.

All of the cards are coupled to a backplane bus 72. The backplane bus enables data to be transmitted from the RS/WD cards to the NIC 76. The bus also provides a path for the control processor 78 to pass control and configuration commands to the VD/AD card 74 and the RS/WD cards 53.

The video digitizer and azimuth decoder card 74 performs the following functions for one radar from the m radar systems 31:
1. The video digitizer 48 performs parallel conversion of multiple analog video input signals to digital signals at the highest resolution required (typically 42 Mhz per sample and 4 to 8 bits per sample) synchronized to the zero range trigger input.
2. The azimuth decoder 50 converts the azimuth data from the radars particular format to a digital azimuth number (this conversion occurs once per radar pulse) synchronized to the zero range trigger input.
3. The pixel bus output 51 broadcasts the azimuth number, the trigger and all digital samples to the range scale and window detection cards 53.

The range scale and window detection card (RS/WD) 53 contains several channels 55, which perform identical processing which is dedicated to the specific requirements of each display 36. Each channel performs the following functions for one radar from the m radar systems 31.
1. Synchronous digital video mixing of selected video inputs is provided by the video mixer 56, which merges any combination of the multiple video inputs to a single digital output by performing peak detection across the selected video inputs.
2. Range compression is provided by the range compressor 58, which determines the effective range resolution of the data.
3. The pulse correlator 60 may be used to reduce unwanted noise or interference in the signal and may also improve data compression.
4. The azimuth compressor 62 determines the effective azimuthal resolution of the data and reduces bandwidth.
5. The window detector 64 extracts only the data which will ultimately be displayed effectively reducing bandwidth by discarding unnecessary data.
6. The lossless data compressor 66 may employ known redundancy reduction techniques (e.g., run length encoding, arithmetic encoding, etc.) to reduce repetitive information to a smaller representation for bandwidth reduction without information loss.

The buffer 68 supplies the radar pulse information (azimuth number, compressed data, etc.) to the NIC via the backplane interface 70 and backplane bus 72. The NIC then forwards the information to the network 34. Besides transmitting radar data, the NIC 76 may receive configuration commands for the range scale and window detection channels from each display system. The NIC is responsible for dynamic assignment of channels to a specific display, as well as diagnostic testing of all components in the radar processor.

Figure 4:
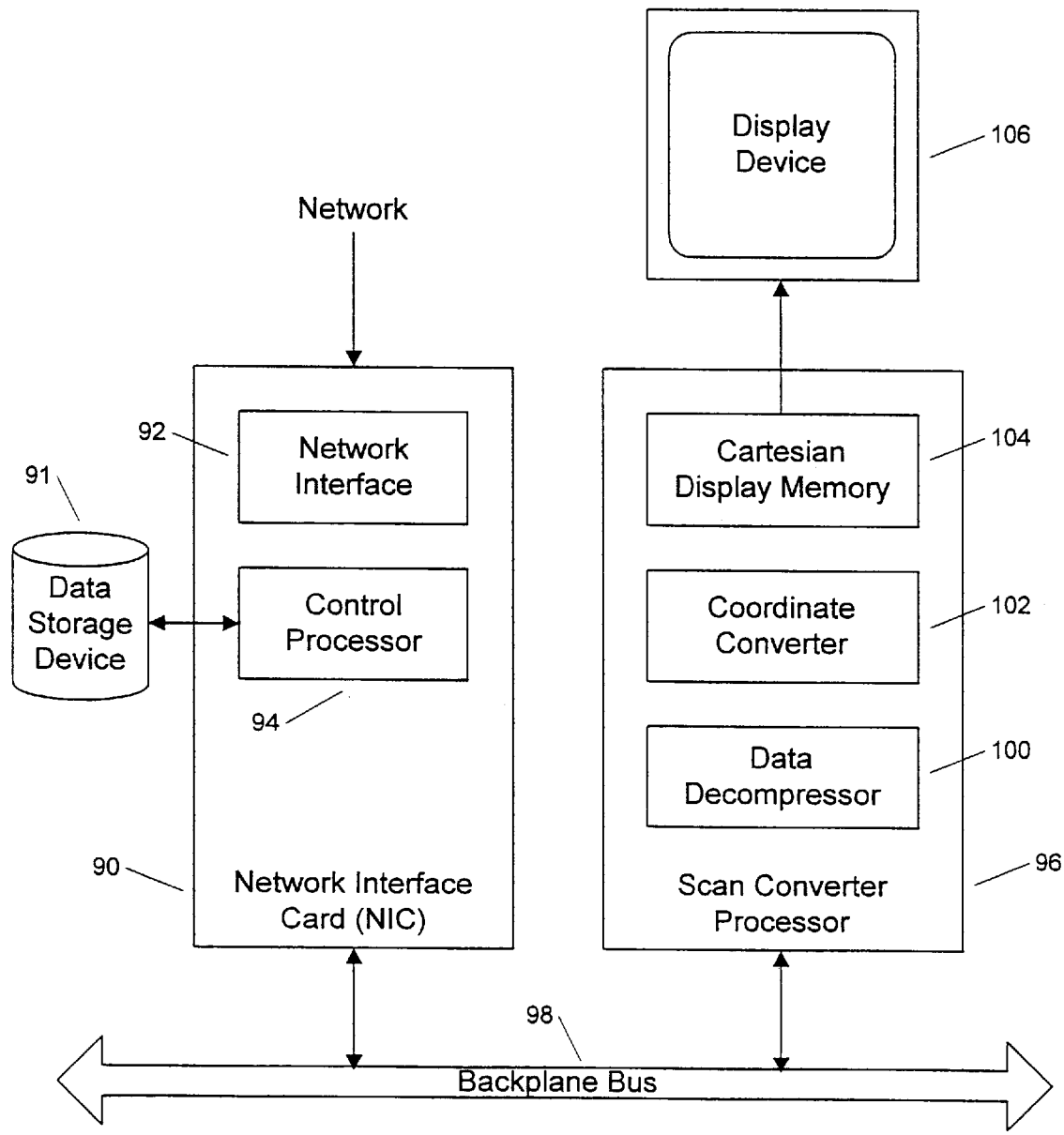
FIG. 4 is a block diagram of the portion of the system architecture of the present invention, which is located at the display end of the digital network.

As shown in FIG. 4, the display console 36 of FIG. 2 has a network interface card NIC 90 that is similar to the NIC 76 shown in FIG. 3. The NIC 90 receives at its network interface section 92 the digitized radar pulse information sent over the network 34, including window-detected video data and azimuth data. This information is received by the display console control processor 94 and is forwarded to the scan converter processor 96 over the display backplane bus 98. Each console may be coupled to a mass storage device 91 over lines 93. The storage device may be used to record segments of the incoming digital data stream for subsequent playback or analysis. The control processor 94 coordinates the operation of the scan converter processor 96 with the assigned video processor channel(s) by sending configuration commands via the network 34 to the radar processor control processor 78.

The scan converter processor 96 receives the window-detected video data and azimuth data from a selected radar system and preferably implements the scan conversion function in accordance with the following tasks.
1. Lossless data de-compression is performed in the data decompressor 100 to restore the original data for conversion, if required.
2. Polar to Cartesian coordinate conversion is achieved by any of a number of known techniques in the coordinate converter 102.
3. The data is output to the Cartesian display memory 104. The Cartesian display memory may also support the decay sub-process 24.
4. The Cartesian display memory is transferred to the display device 106 via the refresh sub-process 26.

The advantages of the described invention may be quantified with reference to the system example from the background section and the preceeding per channel bandwidth analysis. An additional assumption is that the average radar rotation rate is 30 RPM. This assumption reduces the network bandwidth per channel (console) by a factor of two from 4.7 Mbps to 2.35 Mbps. The bandwidth requirement for distribution of the raw digitized video is proportional to the total number of videos from all radars. The bandwidth required for the invention, or for distribution of the raster image is proportional to the number of consoles. Therefore, for the example system the described invention requires 2.35 Mbps times 20 consoles or 47 Mbps, raster video distribution requires 160 Mbps times 20 consoles or 3200 Mbps and raw video distribution requires 336 Mbps times 3 videos/radar times 5 radars or 5040 Mbps. Thus, the invention may deliver a bandwidth reduction factor of 68 over raster video distribution and a bandwidth reduction factor of 107 over raw digital video distribution. The resolution of the samples may be changed to conserve bandwidth. For example, if 4 bits per sample are used instead of 8 bits per sample, then the bandwidth required is cut in half.

The described system of the invention re-partitions the data transmission process to place the network at the lowest bandwidth point in the process. This technique provides a custom view to each user, uses far less network bandwidth without compromising video fidelity, and provides appreciable cost benefits when compared to prior art systems. This system can share existing high performance networks and makes radar video available to any network user. Displays may utilize dedicated scan conversion hardware to perform real-time display of all radar video input and aging to provide equivalent functionality as with prior art systems, although at reduced cost per display due to the lack of dedicated radar interface hardware. Displays may also operate without dedicated scan conversion hardware by periodically capturing data from the network and performing non-real-time scan conversion by software emulation of the scan conversion process. This software scan conversion may also be performed at any display and re-distributed over the network to other displays in Cartesian form at lower refresh rates, or on demand. With systems of the prior art, radar display was limited to only those workstations with a dedicated radar connection and expensive scan conversion hardware.

The networked distribution of a low-bandwidth representation of the polar coordinate radar analog data may be used to support new functions other than scan conversion for immediate display. The radar data may be recorded by any processor with network access using a mass storage device, such as a magnetic disk drive for later playback. The radar data may also be distributed to any processor on the network, and collected and analyzed in polar coordinate format for purposes such as polar integration, contact detection and target tracking.

The Cartesian coordinate scan conversion in the display 36 may be implemented in a manner similar to prior art scan conversion techniques. However, the display scan converter used in the invention does not have to contain hardware or software that enables it to do all of the processing of the received radar video data required to obtain window-detected data, as would a conventional Cartesian display converter. All of the elements required by prior scan converters through the window detection are on the input side of the network 34 and are implemented in radar processors associated with the radars in this present invention.

While window detection in the preferred embodiment is described by reference to a particular illustrative architecture and to particular numerical values for illustrative purposes, it is not limited thereto. Further, although Cartesian scan conversion has been described, the window detection technique of the invention is applicable to any radar system in which processed radar video data may be distributed in a manner that is more extensive than the display coupled to receive the video data can display or otherwise process. The term "window" as used in connection with this invention, therefore, refers to the technique of restricting the radar video data to conform to limitations imposed by the receiving display such as available viewing area.

What is claimed is:

1. A radar and display system comprising:
   (a) one or more displays,
   (b) one or more radar and antenna units each of which produces analog data comprising azimuth, analog range and video data, with each of said radar systems being associated with separate radar processors each of which has at least one channel comprising:
      (1) a video digitizer coupled to receive said analog range and video data for providing digital range and video data representative of said analog range and video data,
      (2) an azimuth decoder coupled to receive analog azimuth data representative of the azimuth of one or more antennas associated with a radar for providing azimuth decoded digital data,
      (3) a range compressor coupled to receive said digital video data and range data for compressing said digital video data and said digital range data and to sort said digital video data into range bins,
      (4) a window detector coupled to receive said range compressed digital video data and said digital azimuth data for providing digital window-detected data, and
   (c) an interconnection network coupled between said window detectors and the data inputs of said displays for transmitting said digital window-detected data to said displays and for transmitting control signals from said displays to said radar processors for selecting the images to be displayed.

2. A radar and display system as claimed in claim 1 wherein said displays convert said digital window-detected data to Cartesian coordinate display data.

3. A radar and display system as claimed in claim 2 wherein said display employs non-real-time scan conversion.

4. A radar and display system as claimed in claim 1 wherein digital azimuth decoded data is coupled to said displays.

5. A radar and display system as claimed in claim 4 wherein said displays convert said digital window-detected data to Cartesian coordinate display data.

6. A radar and display system as claimed in claim 5 wherein said display employs non-real-time scan conversion.

7. A radar and display system as claimed in claim 1 wherein one or more of said radar processors comprise a video mixer that provides composite images of multiple videos for said displays.

8. A radar and display system as claimed in claim 1 wherein one or more of said radar processors comprise a plurality of channels for transmitting digital radar data to one or more displays.

9. A radar and display system as claimed in claim 8 wherein one or more of said radar processors comprise a video mixer that provides composite images of multiple videos for said displays.

10. A radar and display system as claimed in claim 1 wherein said radar processors comprise an azimuth correlator coupled to receive said digital range compressed data and said digital azimuth decoded digital data for reducing unwanted noise or interference in the radar video signal and allowing for potential improvement in data compression.

11. A radar and display system as claimed in claim 1 wherein said radar processors comprise an azimuth compressor coupled to receive said digital range compressed data and said digital azimuth decoded digital data for reducing the effective pulse repetition frequency applicable to said range compressed data before window detection of said range compressed data is performed.

12. A radar and display system as claimed in claim 11 wherein said radar processors comprise an azimuth correlator coupled to receive said digital range compressed data and said digital azimuth decoded digital data for reducing unwanted noise or interference in the radar video signal and allowing for potential improvement in data compression.

13. A radar and display system as claimed in claim 1 wherein said radar processors comprise a lossless data compressor coupled to receive said window-detected data, and said displays comprise a lossless data decompressor for decompressing the data compressed by said lossless data compressor.

14. A radar and display system as claimed in claim 1 wherein said displays comprise a storage device coupled to said displays and to said network for the storage and playback of digital radar data from said network.

15. A radar and display system as claimed in claim 1 wherein said displays are constructed to receive window-detected data from multiple channels of one or more radar processors for the display of composite or multiple images.

16. A method of converting and displaying radar data supplied by one or more analog radar systems each with separate radar processors to one or more displays over a digital network comprising the steps for each of said radar systems of:

(a) digitizing analog video data and range data, (b) digitizing azimuth analog data, which is representative of the azimuth of one or more antennas associated with a particular radar system, (c) applying range compression to said digital video data and said digital range data to provide compressed digital video data, (d) sorting said digital video data into range bins, (e) applying window detection to said range compressed digital video data and said digital azimuth data to provide digital window-detected data, and (f) transmitting said digital window-detected video data over said digital network to said display system and control signals from said displays to said radar processors for selecting the images to be displayed.

17. A method as claimed in claim 16 comprising the step of transmitting digital azimuth decoded data over said network to said displays.

18. A method as claimed in claim 16 comprising the additional step of converting polar coordinate radar video data to Cartesian coordinate display data at said display systems.

19. A method as claimed in claim 18 wherein the step of converting polar coordinate radar video data to Cartesian coordinate display data is a non-real-time scan conversion step.

20. A method as claimed in claim 17 comprising the additional step of converting polar coordinate radar video data to Cartesian coordinate display data at said display systems.

21. A method as claimed in claim 20 wherein the step of converting polar coordinate radar video data to Cartesian coordinate display data is a real-time scan conversion step.

22. A method as claimed in claim 16 comprising the additional step of video mixing radar data to provide selected digital data representative of multiple radar videos for said displays.

23. A method as claimed in claim 16 comprising the additional step of transmitting said radar data from said radars over a plurality of channels to one or more of said displays.

24. A method as claimed in claim 23 comprising the additional step of video mixing radar data to provide selected digital data representative of multiple radar videos for said displays.

25. A method as claimed in claim 16 comprising the additional step of azimuth correlation for reducing unwanted noise or interference in the radar video signal and allowing for potential improvement in data compression.

26. A method as claimed in claim 16 comprising the additional step of azimuth compression to reduce the effective pulse repetition frequency applicable to said range compressed data before window detection of said range compressed data is performed.

27. A method as claimed in claim 26 comprising the additional step of azimuth correlation for reducing unwanted noise or interference in the radar video signal and allowing for potential improvement in data compression.

28. A method as claimed in claim 16 comprising the additional step of lossless data compression of digital window-detected video data and comprising the step of decompressing said digital compressed video data at said displays.

29. A method as claimed in claim 16 comprising the additional step of storing said digital window-detected video data for subsequent playback.

30. A method as claimed in claim 16 comprising the additional step of receiving window-detected video data from multiple channels for the display of composite or multiple images.

\* \* \* \* \*